Figure 1:
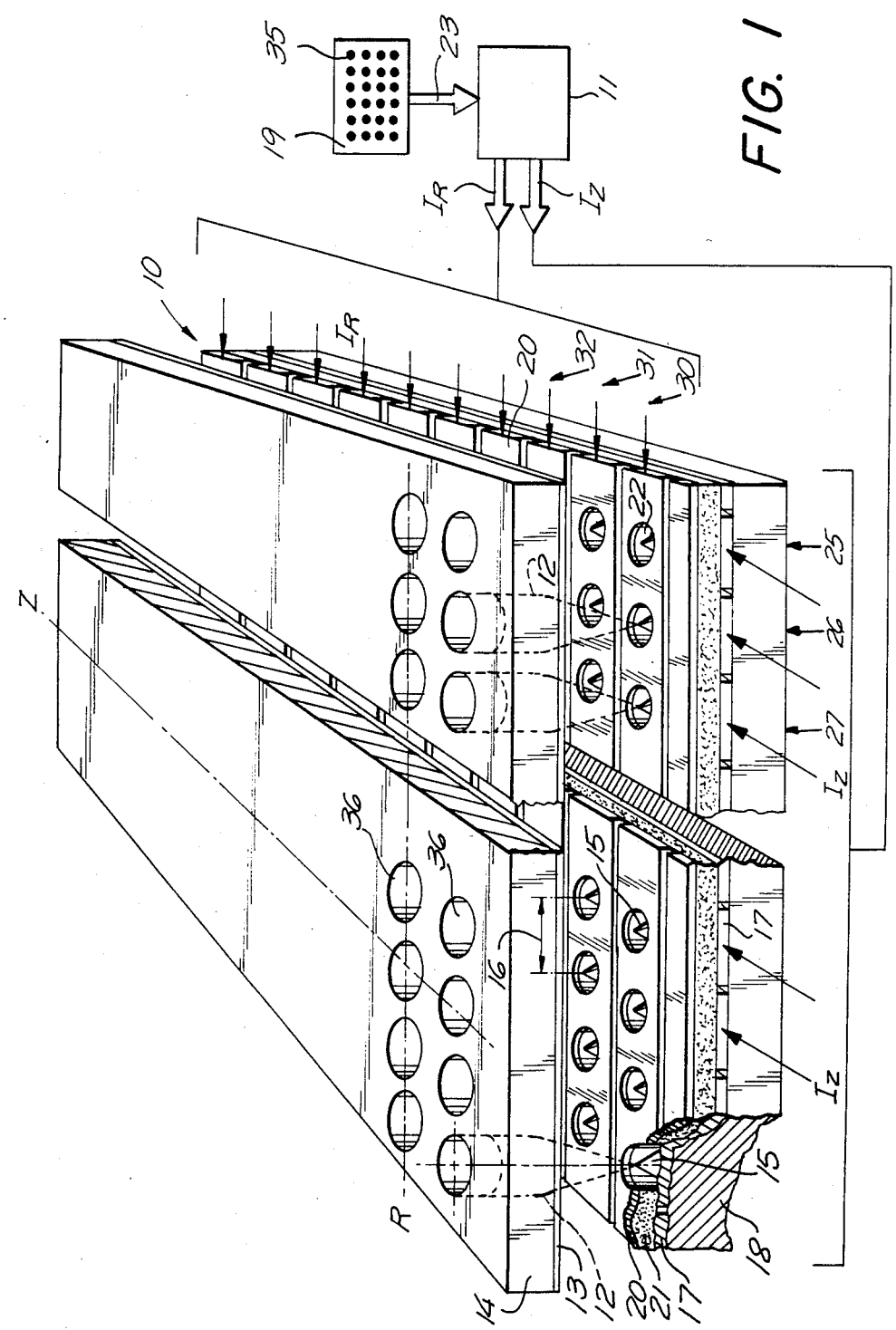

United States Patent [19]

Hirt

[11] Patent Number: 4,575,765
[45] Date of Patent: Mar. 11, 1986

[54] METHOD AND APPARATUS FOR TRANSMITTING IMAGES TO A VIEWING SCREEN

[75] Inventor: Alfred Hirt, Munich, Fed. Rep. of Germany

[73] Assignee: MAN Maschinenfabrik Augsburg Nurnberg AG, Munich, Fed. Rep. of Germany

[21] Appl. No.: 544,092

[22] Filed: Oct. 21, 1983

[30] Foreign Application Priority Data

Nov. 25, 1982 [DE] Fed. Rep. of Germany ....... 3243596

[51] Int. Cl.$^4$ ............................................. H04N 3/14
[52] U.S. Cl. .................................... 358/230; 358/241; 315/169.3; 340/781
[58] Field of Search .................. 358/230, 241, 242, 59, 358/44; 313/585; 340/781; 315/169.2, 169.3

[56] References Cited

U.S. PATENT DOCUMENTS 3,855,499 12/1974 Yamada et al. ...................... 340/781
4,459,514 7/1984 Morimoto et al. .................. 340/781

Primary Examiner—Tommy P. Chin
Attorney, Agent, or Firm—Alan H. Levine

[57] ABSTRACT

Method and apparatus for the transmission of images to a screen, wherein luminescence centers of the screen are excited by way of electron beams controlled to suit the image to be transmitted. The electrons are emitted by cathode tips of a thin-film field-effect cathode. The cathode tips are driven individually, the flow of electrons emitted from each cathode tip corresponding to the grey tone for each image point. The cathode tips may be driven by mutually intersecting conducting strips to which are fed successive trigger pulses. In another version, the cathode tips are driven by the use of charge transfer systems, which enable a still picture to be produced by concurrently driving the cathode tips in their entirety.

7 Claims, 4 Drawing Figures

METHOD AND APPARATUS FOR TRANSMITTING IMAGES TO A VIEWING SCREEN

This invention relates to a method and apparatus for transmitting images to a viewing screen, wherein luminesence centers of the screen are excited by electron beams controlled to suit the image to be transmitted.

The known method used with conventional television sets to transmit images to a screen is to employ a cathode ray tube, the electrons issuing from the thermionic cathode being intensity modulated and focussed on a spot on a fluorescent screen to form, by means of consecutive deflection, a line scanning pattern corresponding to the image to be projected. The image consists of all the luminous spots of various grey shades produced in the process of the fluorescent screen.

In an attempt to obviate the relatively bulky picture tube, various suggestions have been made for new systems. One approach being attempted, for example, employs electroluminescence units. A known attempt in this direction is the so-called high-field luminescence indication, in which a polycrystalline active layer deposited on a flat glass substrate is doped with luminescent centers which are excited by highly energetic charge carriers and emit light when they subsequently return to their starting condition (Elektronik Journal, Volume 17, 1982, Page 78). While such units are indeed small and flat, they essentially find use only in illuminated displays, as perhaps in measuring and control devices.

Known also is a gas-discharge principal (Elektronik Journal, Volume 17, 1982, Page 86), in which numerous tightly packed gas discharge diodes are used in a compact stacked arrangement. The diodes are connected together like a matrix, by cathode and anode wires running within the stack arrangement, to form a diode raster driven line-by-line by a serial-input shift register, with each diode producing an image point. However, the manufacture of such gas discharge scanning screens is rather involved. The necessary relatively great minimum width of the diode causes this process to produce a relatively coarse-grain reproduction of the image.

In a broad aspect of the present invention, a method is provided which, using a maximally compact unitary construction, is capable of projecting a high-quality image on a screen.

It is a particular object of the present invention to provide a method in which an electron field is emitted by means of a thin-film field-effect cathode, arranged on the surface area of which are regularly distributed emission tips associated with the various image points, and wherein the emission tips are driven separately.

The principle of the thin-film field-effect cathode is known (Journal of Applied Physics, Vol. 47, No. 12, 1976, P. 5248 et seq.) The cathode tips are disposed adjacent to one another in coplanar arrangement between two electrodes and each emits a conical stream of electrons when a driving potential is applied to the electrodes.

In accordance with the present invention, the cathode or emission tips are driven individually to suit the image to be transmitted, and the electrons emitted are directly projected on a viewing screen arranged at a suitable distance from the thin-film cathode. This produces, for each cathode tip, an image point the grey tone of which corresponds to the magnitude of the emission stream of the associated cathode tip. This eliminates the need for deflection of the electrons emitted which characterizes the cathode ray tube. It makes for static reproduction of the image and eliminates the flicker associated with the conventional process. The fixed arrangement of the emission tips, and thus of the image points, affords another substantial advantage in that image distortion or noise generated by electric or magnetic fields is prevented. As a result of cold emission, the method of the present invention also absorbs less energy than the method using a thermionic cathode.

Inasmuch as the thin-film cathodes can be manufactured with very closely spaced emission tips (about 12 $\mu$m apart), their use will produce fine-grain high-resolution images, and a failure of individual image points will be impossible to locate, as may be the case with the known gas discharge scanning screens when gas discharge diodes are not triggered.

Accordingly, the method of the present invention permits high-quality images to be projected on a viewing screen. It provides another advantage in that the electron emission screen unit has a flat shape a few centimeters thick, which when used in television sets substantially reduces the overall size from that of conventional sets.

Preferably, the emission tips are driven in the form of a double raster. This enables use to be made of conventional transfer registers which receive the information from a raster scanning the image to be transmitted and impart it to the electron emission unit.

In a further aspect of the present invention the emission tips are driven by two intersecting sets of conducting strips used as electrodes, the conducting strips of a each set consecutively receiving trigger pulses. Whenever one conducting strip of each of the two noncommmunicating sets of conducting strips is provided with a trigger pulse, that emission tip located at the intersection of the two conducting strips is driven. This provides a rather simple method of individually driving the cathode tips of a line consecutively by injecting trigger pulses into the conducting strip of a set and successively into the conducting strip of the second set.

In a further aspect of the present invention the cathode tips are driven via charge transfer systems. Charge transfer systems generally contain series of storage elements which can be charged with diverse charge packets, the charge packets of the storage elements being shifted under clock control a storage zone at a time.

With a charge transfer system of this description, a first storage group can be associated with an image sensor and a second stage group with the driving electrodes for the cathode tips, each storage element being associated with an image point or with the driving electrode of a cathode tip. Then, when in keeping with the image points, the storage elements of the first group are charged according to their grey values, the charge packets are shifted to the storage elements of the second group, which enables the electrodes to be driven individually. This permits the simultaneous excitation of all electrode tips and, hence, of all luminescence centers on the screen, to produce the image prevailing at the moment, which again improves the picture quality. The image appearing on the screen, therefore, is a "still" that gives absolute freedom from flicker.

The charge-transfer system is preferably integrated in the thin-film cathode, where a series of charge transfer system storage elements can be used as individual trigger electrodes for the various cathode tips. The remaining storage elements are combined into transport register rows arranged in the thin-film cathode in alternating disposition with rows of cathode tips and their electrodes. In this manner, each transport register row is associated with a line of the raster scanning the image line-by-line.

The inventive concept also embraces apparatus for implementing the method.

Figure 2:
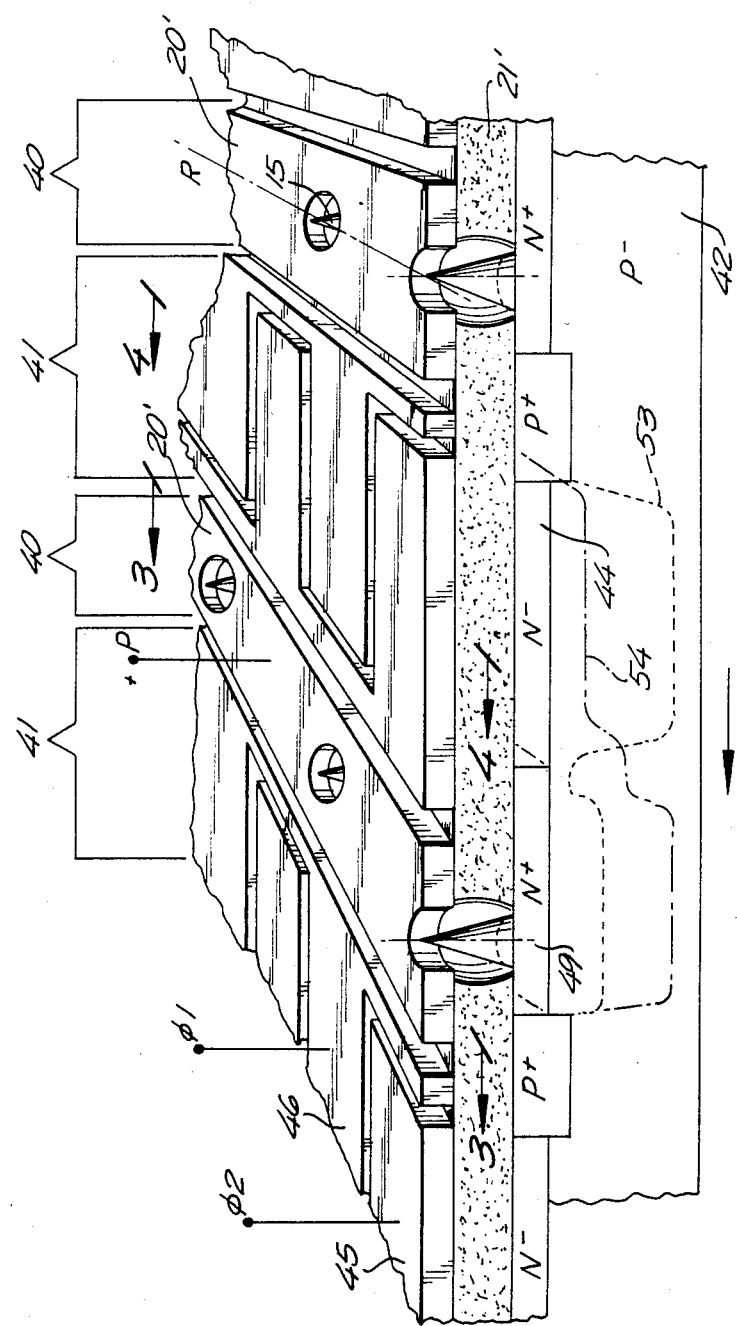
Figure 3:
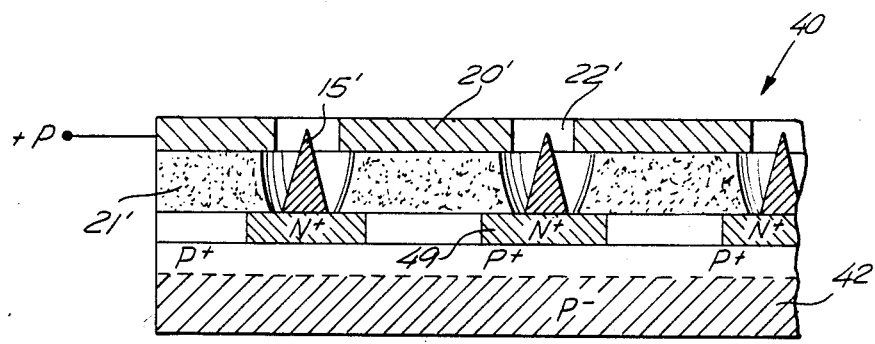
Figure 4:
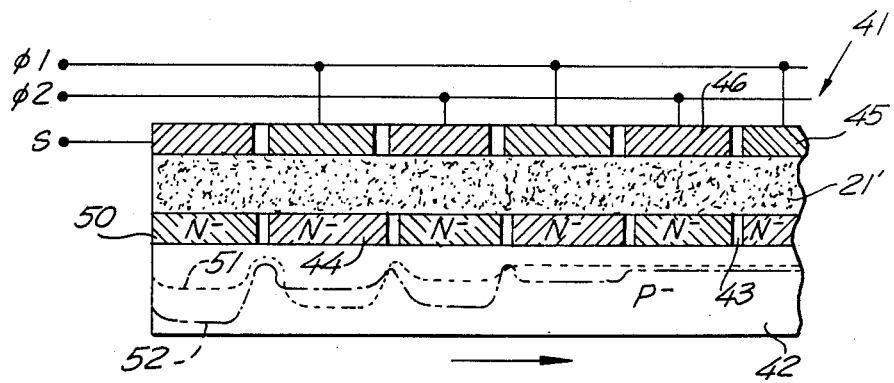

The accompanying drawings are schematic illustrations of embodiments of the present invention, in which:

FIG. 1 is a perspective view of a general system arrangement;

FIG. 2 illustrates a further embodiment of a thin-film field-effect cathode, and FIGS. 3 and 4 are cross-sectional views taken along lines 3–3 and 4—4, respectively, of FIG. 2.

FIG. 1 illustrates, schematically, an image transmission device, wherein a thin-film field-effect cathode 10 is activated by a control register 11 to emit electron beams 12 projected on a screen 14 provided with a fluorescent layer 13. The thin-film field-effect cathode 10 consists of a flat laminated body having numerous conical cathode tips 14, which may be of molybdenum, arranged in rows at a tip spacing 16 of 12 $\mu$m or more. The cathode tips 15 located along lines Z are in electrically conductive contact with a silicon electrode 17, which forms a common conducting strip, the strips extending in adjacent arrangement on a substrate 18. For the second electrode, molybdenum trigger electrodes 20, again taking the shape of conducting strips, are associated with the cathode tips 15 located along rows R. The trigger electrodes 20 are arranged on the electrodes 17, a silicon oxide insulation layer 21 being between the electrodes. The trigger electrodes 20 and the insulation layer 21 have aligned holes 22 in which are arranged the respective electrode tips 15.

In order to transmit an image 19, the image is scanned raster-fashion and the resulting information 23 is routed to the control register 11. The register, in a suitably timed cycle, transmits trigger pulses $I_Z$ to, e.g., line 25 and, simultaneously, pulses $I_R$ to rows 30, 31, 32, etc. consecutively, driving the electrode tips 15 of line 25 one after the other. Thereafter pulses $I_Z$ are transmitted to line 26, and, simultaneously pulses $I_R$ to row 30, etc., thereby successively driving the electrode tips of the second row. In this manner, the various electrode tips 15 arranged at points of intersections of the electrode grids 17 and 20 are individually driven, but only when the two associated electrodes 17 and 20 receive simultaneous pulses. In the process, a driving voltage is applied to each electrode tip 15 which corresponds to the intensity of grey tone of the associated image point 35. On the screen 14 there finally results an image which consists of points 36 of various grey scale levels varying with the intensity of the flow of electrons 12, the image corresponding to image 19.

The screen is arranged at a distance from the thin-film field-effect cathode 10, the distance being selected such that an electron cone 12 impinges on several grains of the luminescent layer, but at the same time the luminous spots 36 are sufficiently close together for adequately high resolution.

Illustrated schematically in FIG. 2 is another version of the thin-film cathode. In this case, the electron emission portion 40 is integrated together with a charge transfer system 41 into a unitary construction. As in the preceding example, conducting strips are provided, as accelerating electrodes 20', for each row of cathode tips R. The charge transfer systems 41 each consist of a transport register, which is shown in cross-section in FIG. 4, and a transfer register shown in FIG. 2. The transport register contains a row of N$^-$ silicon storage elements 44, arranged on a P$^-$ silicon substrate 42 and separated one from the other by barrier layers 43, plus two transport electrodes 45 and 46.

The transfer register forms the link between the cathode section 40 and the transport register. The transfer register of a charge transfer system 41 is formed by parallel N$^+$, N$^-$ pairs of storage elements 49 and 44 associated with the various cathode tips 15'. The N$^+$ storage elements 49 form the second electrodes associated with the various cathode tips 15', while the N$^-$ storage elements 44 are those of the transport register. As a transfer electrode for the transfer register, use is simultaneously made of one of the two transport electrodes, which in this example is the one indicated by the numeral 45.

In operation of the image transmission device, a potential P is applied to each of the accelerating electrodes 20'. The cathode tips 15' are driven by the charge transfer system 41. For this purpose, the image to be transmitted is scanned in a line via sensor S (FIG. 4), and a first storage element 44 of a transport register is successively charged proptionally to the respective image point of the line scanned. The charges are simultaneously transported in the direction of the arrowhead from one storage element 44 to the next storage element 44 via alternating, complementary cycles $\phi 1$ and $\phi 2$ (FIG. 4), which causes instantaneous potential waves 51 (dashed wave line) to be generated below the transport electrode 45 and 46.

In the next cycle, the charge packets are each shifted through a zone as shown by the dot-dash wavy line 52. This recharges the first storage element 50 in accordance with the next image point intensity. After a transport register has been charged, the sensor will scan a new image line and so charge a second transport register. The charge packets of a transport register are simultaneously shifted to the electrodes 49 of a cathode tip row R by feeding a signal to the transfer electrode 45, so that the corresponding cathode tips 15' are driven to emit commensurate flows of electrons. The associated potential waves before and after the transfer are indicated in FIG. 2 by the numerals 53 and 54, respectively. In this manner, the cathode tips 15' are driven row by row. However, the cathode tips 15' can also be driven simultaneously in their entirety by first charging all transport registers and then shifting their charges simultaneously in the transfer register.

As a rule any appropriate method can be used to drive the cathode tip matrix individually using a driving potential proportional to the respective image point. It is equally possible to apply a constant bias voltage to the cathode points, the bias voltage running just below the field emission starting point. As a result, only a relatively small region of the emission curve required for dynamically driving all grey levels of the luminescent layer must be traversed (about 10 V), which eliminates the need for applying the entire driving voltage.

The image transmission device can be used both in control and monitoring engineering for optical indication and television work and in scientific areas. The image generated on the small screen is magnified as required using conventional projection optics.

The use of multiple-color luminous layers enables color images to be achieved using, for example, the known principle in which adjacent blue, green, and red bands extending across the entire image are built up to produce the color image. Owing to the modest tolerances on image plates it will be simpler to project three separate image plates one over the other using intervening color filters.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. A method of transmitting images to a viewing screen having luminescence centers which can be excited by electron beams, comprising the steps of:
providing a thin-film field-effect cathode having cathode tips uniformly distributed over the surface of the cathode, each cathode tip being representative of an image point to be transmitted, and
separately controlling each cathode tip, and driving the cathode tips in the form of a double raster by charge transfer systems.

2. A method as defined in claim 1, including providing electrodes in the form of two sets of conducting strips, and driving the cathode tips by consecutively applying trigger pulses to each set of conducting strips.

3. Apparatus for transmitting images, comprising a thin-film field-effect cathode having cathode tips uniformly distributed over the surface of the cathode,
a charge transfer system associated with the cathode for individually energizing each cathode tip to produce an electron beam, and
a fluorescent screen located within the field of the electron beams.

4. Apparatus as defined in claim 3 wherein the cathode tips are located along a grid of intersecting lines, the cathode tips located along one line having a common electrode, and the cathode tips located along an intersecting line having a different common accelerating electrode.

5. Apparatus as defined in claim 3 wherein the charge transfer system is integrated into the thin-film field-effect cathode.

6. Apparatus as defined in claim 5 wherein the charge transfer system has storage elements which form part of the electrodes for the cathode tips.

7. Apparatus as defined in claim 6 wherein the thin-film field-effect cathode has an insulating layer, the storage elements being on one side of the insulating layer, and on the other side of the insulating layer a pair of transport electrodes for the charge transfer system arranged alternately with a conducting strip type accelerating electrode, one of said electrodes being associated with each row of cathode tips.

* * * * *